US012122644B2

(12) United States Patent
Doms

(10) Patent No.: US 12,122,644 B2
(45) Date of Patent: Oct. 22, 2024

(54) SEAT FOR A STAIR LIFT

(71) Applicant: OTOLIFT TRAPLIFTEN B.V., Bergambacht (NL)

(72) Inventor: Jan Otto Doms, Bergambacht (NL)

(73) Assignee: OTOLIFT TRAPLIFTEN B.V., Bergambacht (NL)

( * ) Notice: Subject to any disclaimer, the term of this patent is extended or adjusted under 35 U.S.C. 154(b) by 0 days.

(21) Appl. No.: 18/265,119

(22) PCT Filed: Dec. 9, 2021

(86) PCT No.: PCT/NL2021/050753
§ 371 (c)(1),
(2) Date: Jun. 2, 2023

(87) PCT Pub. No.: WO2022/124899
PCT Pub. Date: Jun. 16, 2022

(65) Prior Publication Data

US 2024/0002192 A1 Jan. 4, 2024

(30) Foreign Application Priority Data

Dec. 10, 2020 (NL) ...................................... 2027090

(51) Int. Cl.
*B66B 9/08* (2006.01)
*A61G 7/10* (2006.01)
*E04F 11/02* (2006.01)

(52) U.S. Cl.
CPC .......... *B66B 9/0853* (2013.01); *A61G 7/1001* (2013.01); *A61G 7/1059* (2013.01); *E04F 11/02* (2013.01)

(58) Field of Classification Search
CPC ....... B66B 9/0853; B66B 9/08; A61G 7/1059; A61G 7/1001; A61G 5/06
See application file for complete search history.

(56) References Cited

U.S. PATENT DOCUMENTS 4,913,264 A * 4/1990 Voves ........................ B66B 9/08 297/344.22
2008/0203775 A1* 8/2008 Caroen ..................... B66B 9/08 297/30
2020/0231411 A1* 7/2020 Foggio, Jr. ............ B66B 9/0853

FOREIGN PATENT DOCUMENTS

CN 104973486 A * 10/2015
GB 778091 A 7/1957
(Continued)

OTHER PUBLICATIONS

Machine Translation of JP 4067186.*
(Continued)

*Primary Examiner* — Diem M Tran
(74) *Attorney, Agent, or Firm* — KDW Firm PLLC

(57) ABSTRACT

A seat for a stair lift includes a horizontal seat, a vertical back rest, and two arm rests. Each arm rest is connected to the seat by a support bracket, and each arm rest is pivotable between folded-down and a folded-up positions. The arm rest is pivotably connected about a pivot axis to the support bracket and to a carrying beam having upper and lower sides. The upper side supports an arm of the sitting person. The arm rest is designed such that lower and upper tangents of the carrying beam extend at the same side of the pivot axis. The lower tangent is at a radial distance from the pivot axis, such that in the folded-up position the carrying beam extends from the vertical plane through the pivot axis in the vertical space behind the vertical plane towards and beyond the back side edge of the seat part.

14 Claims, 4 Drawing Sheets

(56) References Cited

FOREIGN PATENT DOCUMENTS

| | | | |
|---|---|---|---|
| JP | 2003159281 | A | 6/2003 |
| JP | 4067186 | B2 | 3/2008 |

OTHER PUBLICATIONS

International Search Report and Written Opinion mailed Mar. 4, 2022, for Application No. PCT/NL2021/050753 (10 pages).
International Preliminary Report on Patentability for the International Application No. PCT/NL2021/050753, dated Jun. 22, 2023, 6 pages.

* cited by examiner

SEAT FOR A STAIR LIFT

The present invention relates to a seat for a stair lift having a folded-down state wherein a person can sit on the seat, and a folded-up state, which seat comprises: a substantially horizontal seat part which is arranged to carry a sitting person, said seat part having a front side edge, a back side edge and two lateral edges; a substantially vertical back rest which is arranged to support the back of the sitting person, said back rest extending from the vicinity of the back side edge of the seat part; two arm rests which are arranged to support the arms of the sitting person, wherein each arm rest is connected to the seat by means of a support bracket, and wherein each arm rest is pivotable about a substantially horizontal pivot axis extending on said support bracket such that each arm rest is movable between a folded-down position in said folded-down state and a folded-up position in said folded-up state; wherein said arm rest comprises a connecting part which is pivotably connected to said support bracket about said pivot axis and a carrying beam which is substantially beam shaped and having an upper side and a lower side and wherein the upper side of said carrying beam is arranged to carry an arm of the sitting person on a top side thereof, and wherein said carrying beam comprises a longitudinal central axis extending between the upper side and the lower side, a virtual lower tangent which is parallel to said longitudinal beam axis and which touches the lower side of the carrying beam and a virtual upper tangent which is parallel to said longitudinal beam axis and which touches the upper side of the carrying beam. The arm rest may also be, include and/or serve as, a fall protection device for preventing that a person sitting on the seat falls out of the seat. Nevertheless, in the current patent application the device will be referred to as “arm rest”.

A problem with stair lifts, in particular when they are installed on relatively narrow staircases, is that it may be difficult for people to pass the parked seat when it is not in use. To that end according to the prior art, various parts of the seat (including the arm rest) may be hingeable, so that a space is created for a person to pass. Since often the seat is designed to be rotatable about a vertical axis through the centre of the seat, the backside of the seat may need to have a more or less circular shape (seen from above) so as to allow rotation of the backside of the seat without being blocked by the staircase wall and/or the rail. This in turn necessitates the arm rests/fall protection to be mounted relatively close to the front side of the seat (at the widest part of the seat, seen from above).

The goal of the current invention is to provide an improved stair lift which addresses the above restrictions.

To that end the arm rest is designed such that said lower tangent and said upper tangent both extend at the same side of said pivot axis, wherein said lower tangent is at a radial distance from said pivot point, such that in the folded-up position the carrying beam entirely extends at a clearing distance from the vertical plane through said pivot axis in the vertical space behind said vertical plane towards and beyond said back side edge of the seat part.

Preferably said radial distance is more than 5 mm, preferably more than 25 mm, more preferably at least 45 mm. Preferably the vertical plane (A) through said pivot axis on said support bracket extends less than 155 mm, preferably less than 135 mm, more preferably not more than 115 mm from the vertical plane (B) through the front side of the seat, when said seat is in the folded-up state. Preferably in the folded-up position the carrying beam entirely extends at a clearing distance of more than 115 mm, preferably more than 135 mm, more preferably at least 155 mm from the vertical plane (B) through the front side of the seat, when said seat is in the folded-up state.

In a preferred embodiment the vertical plane (A) through said pivot axis on said support bracket extends less than 135 mm from the vertical plane (B) through the front side of the seat, and in the folded-up position the carrying beam entirely extends at a clearing distance of at least 135 mm from the vertical plane (B) through the front side of the seat, when said seat is in the folded-up state. In a more preferred embodiment the vertical plane (A) through said pivot axis on said support bracket extends less than 125 mm from the vertical plane (B) through the front side of the seat, and in the folded-up position the carrying beam entirely extends at a clearing distance of at least 145 mm from the vertical plane (B) through the front side of the seat, when said seat is in the folded-up state. In the most preferred embodiment the vertical plane (A) through said pivot axis on said support bracket extends less than 115 mm from the vertical plane (B) through the front side of the seat, and in the folded-up position the carrying beam entirely extends at a clearing distance of at least 155 mm from the vertical plane (B) through the front side of the seat, when said seat is in the folded-up state.

Preferably the distance between the upper tangent (u) of said carrying beam and the pivot axis is more than 50 mm, preferably more than 80 mm, more preferably at least 100 mm.

Preferably each of said arm rests is substantially L-shaped, wherein the carrying beam is formed by the long leg of said L-shape and the connecting part is formed by the short leg of said L-shape.

In the preferred embodiment also the seat part is pivotable around its back side edge and movable between a folded-up position in said folded-up state and a folded-down position in said folded-down state. Preferably the seat part is pivotable by means of a driven moving mechanism, and wherein the moving mechanism is designed so that the seat part is automatically moved to the folded-down position when the arm rests are being or have been moved to the folded-down position. Furthermore in the preferred embodiment the seat further comprises a footrest, which is also movable between a folded-up position in said folded-up state and a folded-down position in said folded-down state. Preferably the seat part is movable by means of a driven moving mechanism, and wherein the moving mechanism is designed so that the footrest is automatically moved to the folded-down position when the arm rests are being or have been moved to the folded-down position.

The seat further preferably comprises control means for controlling the drive means so as to cause a frame on which the seat is mounted to move along a rail that is installed along a staircase, wherein the control means are provided on at least one of said arm rests. The control means are preferably located near the front end of the arm rest.

The invention also relates to a stair lift comprising a frame provided with engaging means which are designed to engage the rail that is installed along a staircase and drive means which are designed to move the seat along the rail, and a seat that is mounted on the frame.

The invention will now be explained in more detail with reference to an exemplary embodiment shown in the figures, in which.

Figure 1:
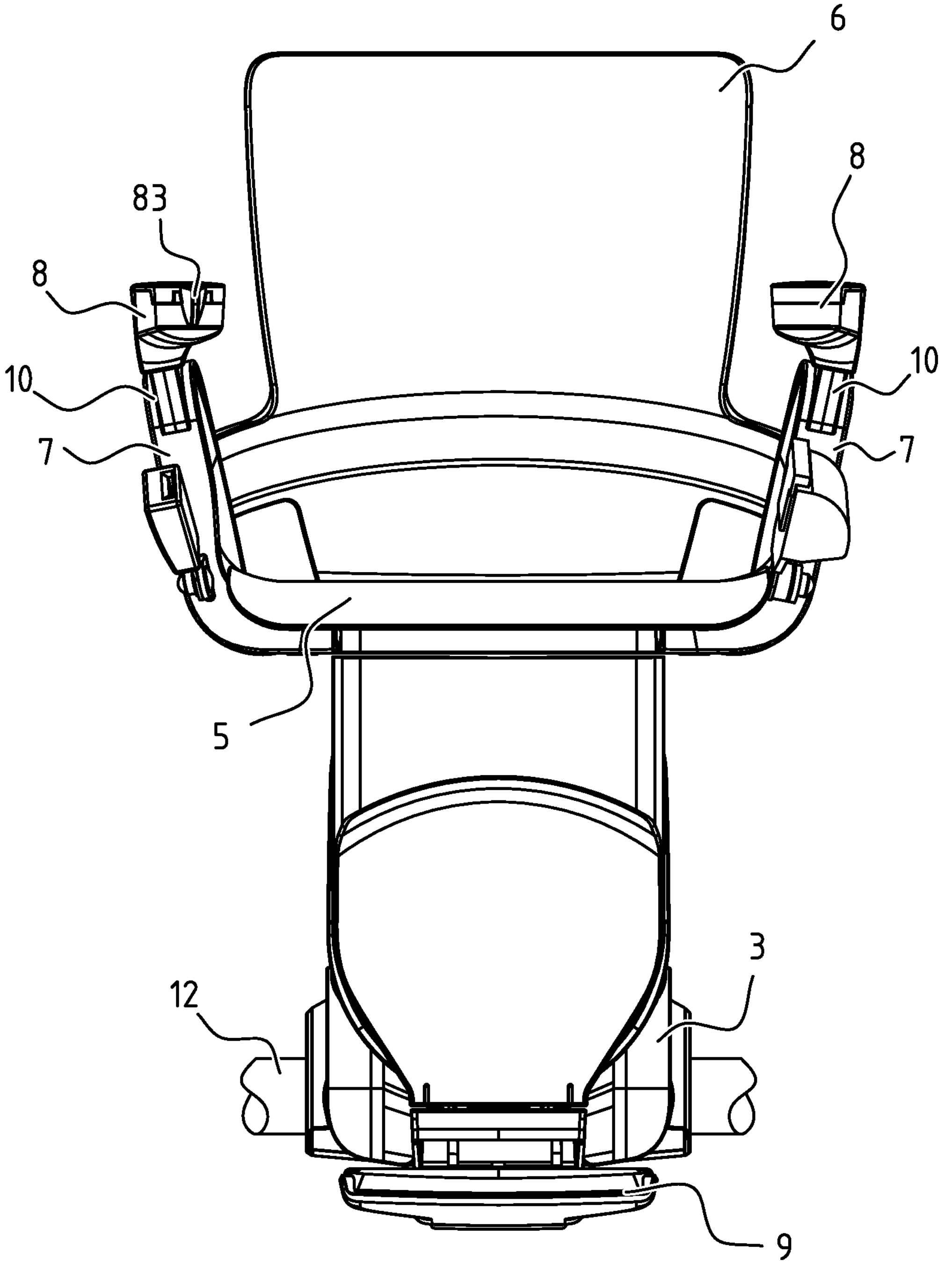
FIG. 1 is a front view of the seat according to the invention provided with an arm rest shown in a lowered position.
Figure 2:
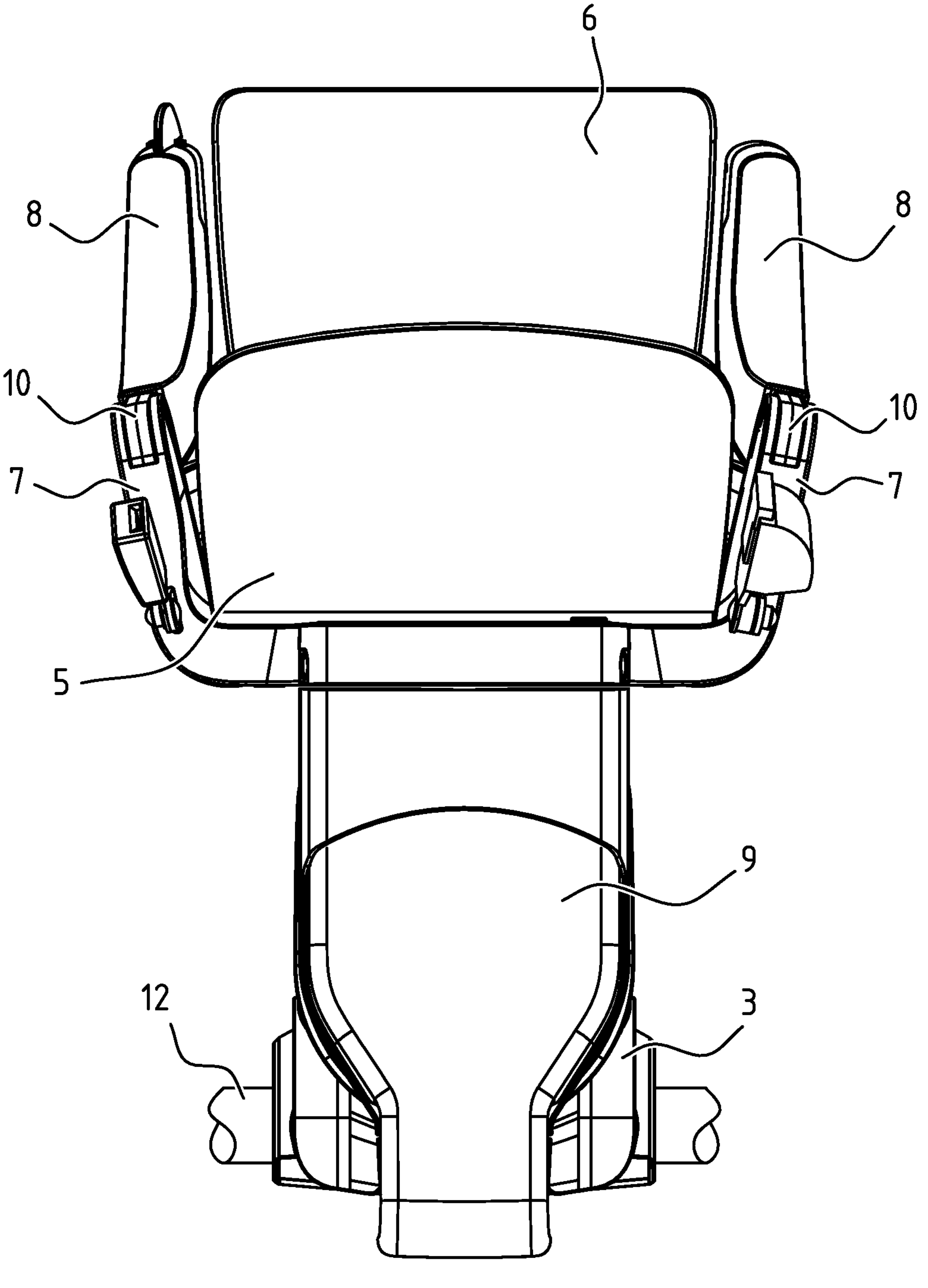
FIG. 2 is a front view of the seat of FIG. 1 with the arm rest shown in the raised position.

According to the figures, a stair lift system which can be installed at a staircase 11 comprises a rail 12, a frame 1 which is designed to move along the rail 12 and which consists of two parts, a part 2 of which engages the rail and another part 3 of which can be rotated with respect to the first part 2 so as to maintain the seat 4 mounted thereon in an upright position. In the figures only one step of 35 the staircase 11 is shown.

The seat 4 comprises a hingeable seat part 5 on which a person can sit, and which is electrically operated, and a backrest 6. Support brackets 7 are fixed to either side of the seat part 5, to which support brackets electrically operated hingeable arm rests 8 are connected by means of a hinge having a hinge axis 10. The arm rests are substantially L-shaped, comprising a relatively short connecting part 82 which is pivotably connected to said support bracket 7 about said hinge axis 10, and a longer arm rest beam 81 connected to or integral with the connecting part 82. The arm rest 8 further comprises control means 83 near the front end of one arm rest beam 81 for controlling the drive means, so as to cause the frame 1 to move along the rail 12.

The seat 4, with the seat part 5, the backrest 6, the brackets 7 and the arm rests 8, is furthermore rotatable about a vertical axis through the central part of the seat part 5, so as to allow a person to easily enter and exit the seat at the ends of the staircase 11. The backside of the seat 4 therefore has a more or less circular circumference (seen from above) so as to allow rotation of the backside of the seat without being blocked by the staircase wall and/or the rail. This in turn necessitates the arm rests 8 to be mounted on the bracket s 7 relatively close to the front side of the seat (at the widest part of the seat, seen from above).

The seat 4 furthermore comprises a hingeable footrest 9, which may be electrically operated. The driving mechanisms of the footrest 9 and the seat part 5 may be electronically connected to the driving mechanism arm rests 8, such that the footrest 9 and the seat part 5 are folded down when arm rests 8 are folded down, and vice versa.

Figure 3:
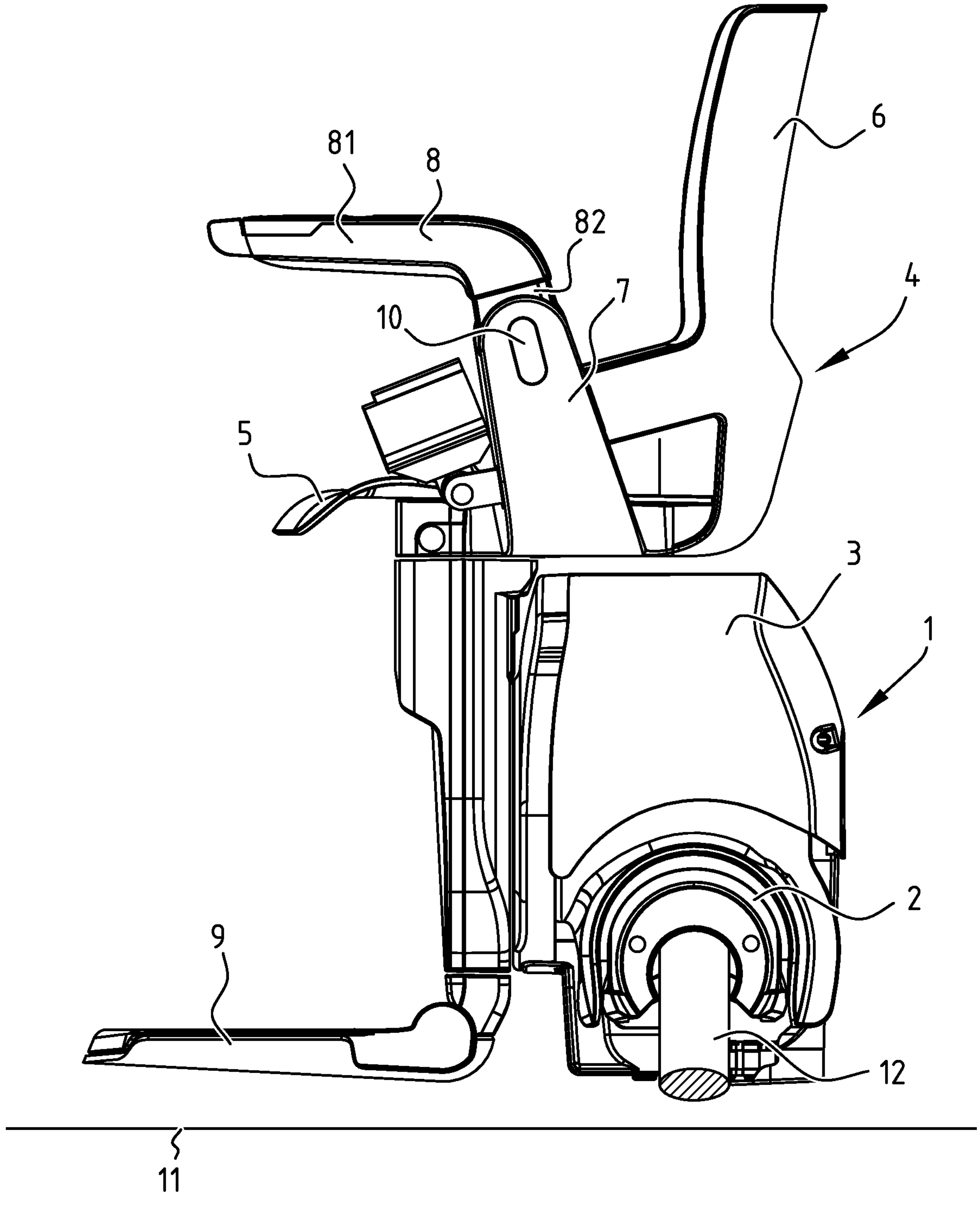
FIG. 3 is a side view of the seat of FIG. 1 with the arm rest shown in a lowered position.
Figure 4:
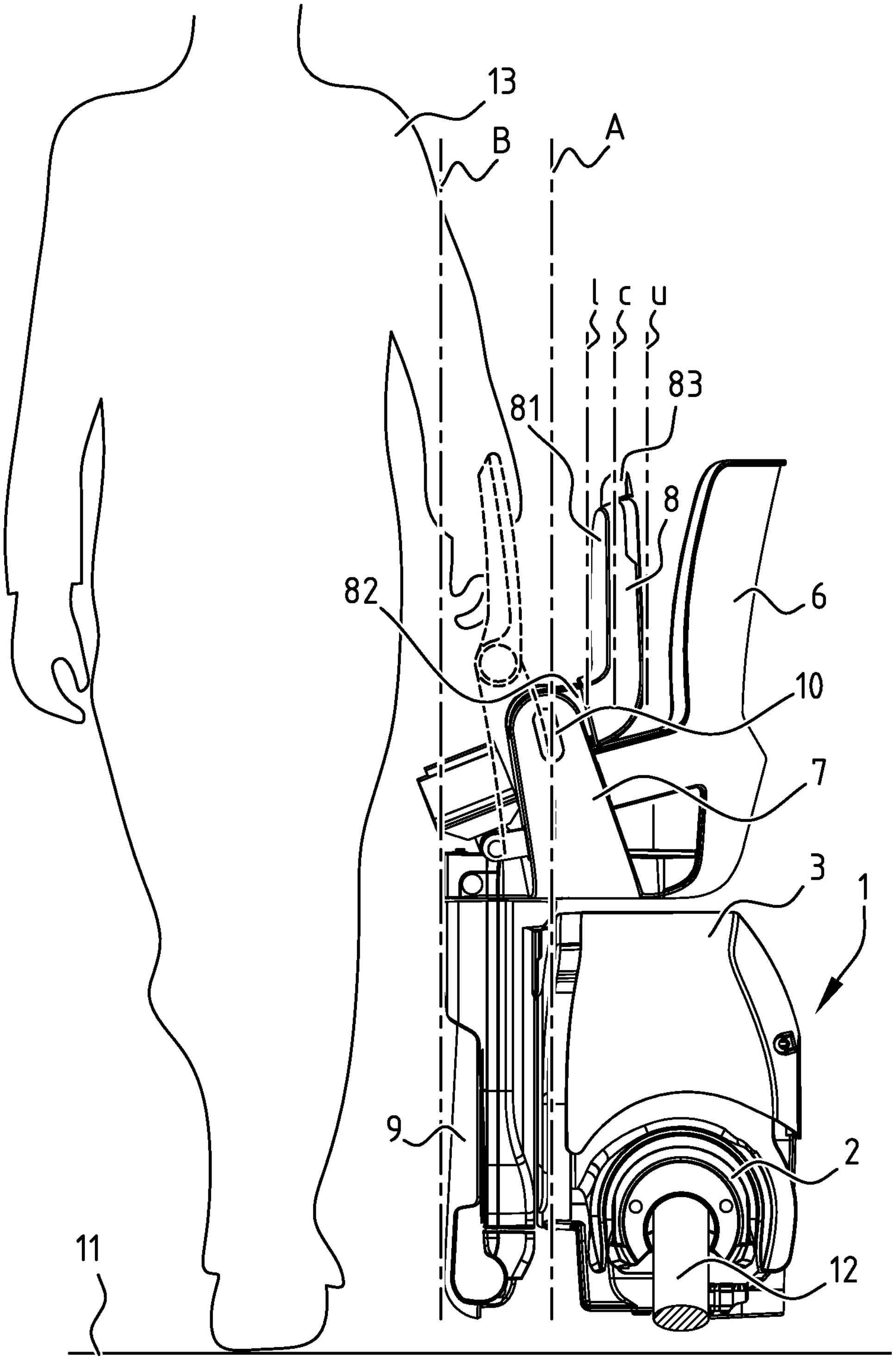
FIG. 4 is a side view of the seat of FIG. 1 with the arm rest shown in the raised position.

By the L-shaped construction of the arm rest, the lower side/of the arm rest beam 81 and the upper side u of the arm rest beam 81 both extend at a distance above the hinge axis 10, as shown in FIG. 3. Thereby the lower side/of the carrying beam 81 extends at a horizontal distance, in this preferred embodiment approximately 46 mm, from the vertical plane A through the hinge axis, when the seat 5 is in the folded-up state as shown in FIG. 4. In the preferred embodiment, the hinge axis 10 on the support bracket extends approximately 114 mm from the vertical plane B through the front side of the seat, and the lower side/of the carrying beam extends at a distance of approximately 159 mm from said vertical plane B through the front side of the seat, when said seat is in the folded-up state as shown in FIG. 4. The distance between the upper side u of the arm rest beam 81 and the hinge axis 10 is in this preferred embodiment approximately 105 mm.

In FIG. 4 a conventional design of a hingeable arm rest is indicated by dashed lines. Through the current design a space of approximately 159 mm wide is created for the free passage of an arm of a person 13 who is walking on the staircase 11 and who passes the seat 1, as shown in FIG. 4, or for the passage of wide objects carried by the person 13. This is in particular advantageous on narrow staircases. Another (additional or alternative) advantage of the current design is that the height of the arm rest in the upright position is lowered thereby, as shown in FIG. 4.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein. An element is to be considered equivalent to an element specified in the claims at least if said element performs substantially the same function in substantially the same way to yield substantially the same result as the element specified in the claims.

The invention claimed is:

1. A seat for a stair lift having a folded-down state wherein a person can sit on the seat, and a folded-up state, the seat comprising:

a substantially horizontal seat part which is arranged to carry a sitting person, said seat part having a front side edge, a back side edge and two lateral edges;

a substantially vertical back rest which is arranged to support the back of the sitting person, said back rest extending from the vicinity of the back side edge of the seat part;

two arm rests which are arranged to support the arms of the sitting person, wherein each arm rest is connected to the seat by means of a support bracket, and wherein each arm rest is pivotable about a substantially horizontal pivot axis extending on said support bracket such that each arm rest is movable between a folded-down position in said folded-down state and a folded-up position in said folded-up state;

wherein said arm rest comprises:

a connecting part which is pivotably connected to said support bracket about said pivot axis, and a carrying beam which is substantially beam shaped and having an upper side and a lower side and wherein the upper side of said carrying beam is arranged to carry an arm of the sitting person on a top side thereof, and wherein said carrying beam comprises a longitudinal central axis (c) extending between the upper side and the lower side, a virtual lower tangent (l) which is parallel to said longitudinal beam axis (c) and which touches the lower side of the carrying beam and a virtual upper tangent (u) which is parallel to said longitudinal beam axis (c) and which touches the upper side of the carrying beam;

wherein the arm rest is designed such that said lower tangent (l) and said upper tangent (u) both extend at the same side of said pivot axis, wherein said lower tangent is at a radial distance from said pivot axis, such that in the folded-up position the carrying beam entirely extends at a clearing distance from the vertical plane (A) through said pivot axis in the vertical space behind said vertical plane (A) towards and beyond said back side edge of the seat part, wherein each of said arm rests is substantially L-shaped and comprises a long leg and a short leg, wherein the carrying beam is formed by the long leg of said L-shape and the connecting part is formed by the short leg of said L-shape.

2. The seat in accordance with claim 1, wherein said radial distance is more than 5 mm.

3. The seat in accordance with claim 1, wherein the vertical plane (A) through said pivot axis on said support bracket extends less than 155 mm, from the vertical plane (B) through the front side of the seat, when said seat is in the folded-up state.

4. The seat in accordance with claim 1, wherein in the folded-up position the carrying beam entirely extends at a clearing distance of more than 115 mm, from the vertical plane (B) through the front side of the seat, when said seat is in the folded-up state.

5. The seat in accordance with claim 1, wherein the vertical plane (A) through said pivot axis on said support bracket extends less than 135 mm from the vertical plane (B) through the front side of the seat, and wherein in the folded-up position the carrying beam entirely extends at a clearing distance of at least 135 mm from the vertical plane (B) through the front side of the seat, when said seat is in the folded-up state.

6. The seat in accordance with claim 5, wherein the vertical plane (A) through said pivot axis on said support bracket extends less than 115 mm from the vertical plane (B) through the front side of the seat, and wherein in the folded-up position the carrying beam entirely extends at a clearing distance of at least 155 mm from the vertical plane (B) through the front side of the seat, when said seat is in the folded-up state.

7. The seat in accordance with claim 1, wherein the vertical plane (A) through said pivot axis on said support bracket extends less than 125 mm from the vertical plane (B) through the front side of the seat, and wherein in the folded-up position the carrying beam entirely extends at a clearing distance of at least 145 mm from the vertical plane (B) through the front side of the seat, when said seat is in the folded-up state.

8. The seat in accordance with claim 1, wherein the distance between the upper tangent (u) of said carrying beam and the pivot axis is more than 50 mm.

9. The seat in accordance with claim 1, wherein the seat part is pivotable and movable between a folded-up position in said folded-up state and a folded-down position in said folded-down state.

10. The seat in accordance with claim 1, wherein the seat further comprises a footrest, which is movable between a folded-up position in said folded-up state and a folded-down position in said folded-down state.

11. The seat in accordance with claim 10, wherein the seat part is movable by means of a driven moving mechanism, and wherein the moving mechanism is designed so that the footrest is automatically moved to the folded-down position when the arm rests are being or have been moved to the folded-down position.

12. The seat in accordance with claim 1, wherein the seat further comprises control means for controlling the drive means so as to cause a frame on which the seat is mounted to move along a rail that is installed along a staircase, wherein the control means are provided on at least one of said arm rests.

13. The seat in accordance with claim 1, wherein the control means are located near the front end of the arm rest.

14. A stair lift comprising:

a frame provided with engaging means which are designed to engage the rail that is installed along a staircase and drive means configured to move the seat along the rail, and the seat according to claim 1 mounted on the frame.

* * * * *